A. V. B. ORR.
SPRING WASHER AND SAFETY NUT.

No. 75,643. Patented Mar. 17, 1868.

Witnesses
H. N. Bowen
J. M. Orr

Inventor
A. V. B. Orr

United States Patent Office.

ADRIAN V. B. ORR, OF STEELEVILLE, PENNSYLVANIA.

Letters Patent No. 75,643, dated March 17, 1868.

---

IMPROVEMENT IN SPRING-WASHER AND SAFETY-NUT.

---

*The Schedule referred to in these Letters Patent and making part of the same.*

---

TO ALL WHOM IT MAY CONCERN:

Be it known that I, ADRIAN V. B. ORR, of Steeleville, in the county of Lancaster, and State of Pennsylvania, have invented a new Spring-Washer and Safety-Nut; and I do hereby declare that the following is a full and exact description thereof, reference being had to the accompanying drawings, and to the letters of reference marked thereon.

The nature of my invention consists in forming the washer which goes under the nut in the shape of a flat circular spring, one end of which being bent down, is fastened in the wood or iron; the other end being raised up, fits into notches formed in the lower surface of the nut, permitting its being turned forwards or tightened, but preventing a backward movement.

To enable others skilled in the art to make and use my invention, I will proceed to describe its construction and operation.

I use any ordinary bolt of any kind or of any required size. I make my nuts of any shape, square, six-sided, eight-sided, or in any other way wanted, and I construct my washer, and the under surface of my nut, as seen in the accompanying figures, the same letters referring to the same parts.

Figure 1:
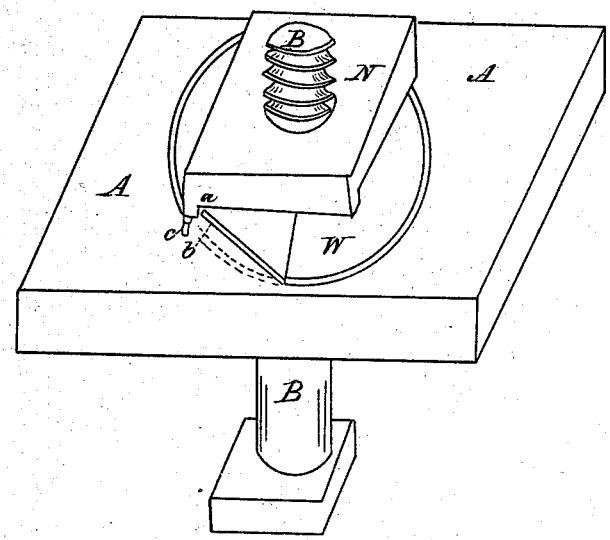
Figure 2:
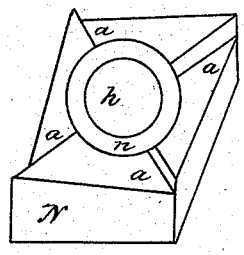
Figure 3:
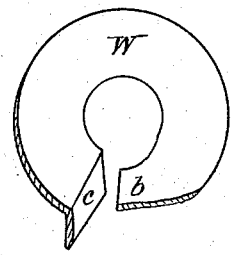
Figure 4:
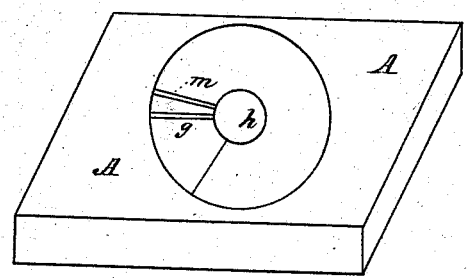

Let A A, Figure 1, represent a piece of wood or a plate of iron, which it is desired to bolt against something else; B B the bolt, W the washer, and N the nut. I prepare the piece A A, as seen in Figure 4. $h$, the hole through which the bolt passes; $m$, a small groove or slit, made to receive the bent end $c$ of the washer W, (Figure 3.) I make in this piece, A A, a slight depression at $g$, equal in depth to the thickness of the washer, to enable the free end, $b$, of the washer to be pressed down below the surface of the nut, when it is desired to unscrew the bolt and take off the nut. I construct my washer W, fig. 3, out of steel or any other elastic metallic substance. The ends, $c$, I bend at right angles with the body, so as to fit the groove $m$ in the plate A A. The other end, $b$, is raised upward, so as to form a spring under the nut, which I construct as follows: Figure 2 represents the lower surface of the nut, or the side coming in contact with the washer; $h$, the hole for the bolts. Around this hole I leave a circular space, $n\ n$, the surface of which is the highest point of the nut, or the portion which rests on the body of the washer. This arrangement is designed to give a continuous and uniform pressure in the act of screwing on the nut. Outside of this circular space $n\ n$, I form a series of notches, $a\ a\ a\ a$, in the nut, usually one for each corner of the nut. These notches $a\ a\ a\ a$ are designed to receive the free or spring end $b$ of the washer, and to prevent the nut from turning backwards.

From this brief description of my invention, I presume it will be seen that, when a plate, washer, and nut are constructed in the manner described, the following must be the operation: The bent portion $c$ of the washer being placed in the groove $m$ of the plate, and the bolt B B being passed through, the nut N, with its notched surface downwards, being now screwed on, the circular space $n\ n$ comes in contact with the body of the washer, while the free or spring end $b$ of the washer enters the notches $a\ a\ a\ a$ of the nut, permitting the nut to be screwed on, but preventing its being turned back. When it is wanted off, by pressing down the point $b$ of the washer into the depression $g$ of the plate A A, the spring is brought below the notches in the nut, and the nut is thus unscrewed.

It is scarcely necessary to call the attention of the office to the mechanical importance of any invention which secures the permanent condition of nuts on machinery or structures subject to continued shocks or jars, especially where such invention combines durability with simplicity of construction.

I am aware that other devices have been proposed for accomplishing the same objects; I do not, therefore, claim to be the originator of this idea, but What I do claim as my invention, and wish to secure by Letters Patent, is—

The notched or ratchet-nut N, with its central bearing $n$, in combination with the spring-washer W, the whole being constructed and operated as described, and for the purpose set forth.

ADRIAN V. B. ORR.

Witnesses:
    H. H. BOWERS,
    J. M. ORR.